Patented Oct. 13, 1953

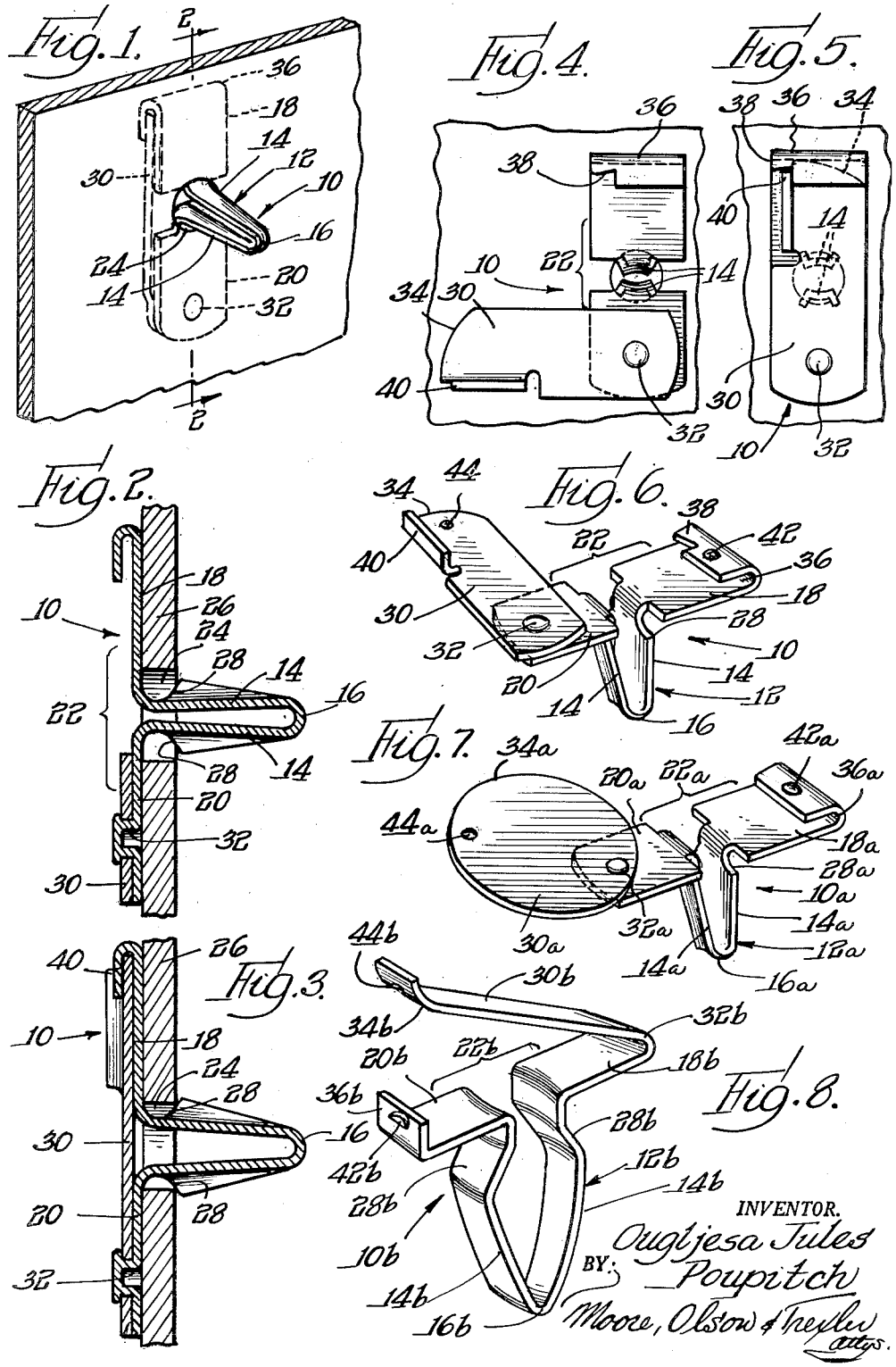

2,655,072

UNITED STATES PATENT OFFICE 2,655,072

FASTENER WITH SPREADING MEANS

Ougljesa Jules Poupitch, Itasca, Ill., assignor to Illinois Tool Works, Chicago, Ill., a corporation of Illinois Application May 23, 1951, Serial No. 227,800

8 Claims. (Cl. 85—5)

This invention relates generally to fasteners of the type which are insertable within preformed apertures in a work piece, and more particularly to fasteners of this type which are readily detachable for reuse.

Devices known in the trade as snap fasteners have heretofore been in common use. These devices usually consist of a headed shank which may be snapped into a complementary work aperture. It is not common practice to reuse such fasteners, and hence they do not lend themselves for applications where work pieces such as panels are to be temporarily secured together and subsequently disassembled.

The present invention is primarily concerned with the provision of a very inexpensive fastener, preferably stamped and formed from sheet metal stock, the shank of which may be inserted within a work aperture so as to provide a firm coupling between work sheets, and with equal facility be withdrawn from the work aperture to permit disassembly of the parts. To this end the invention contemplates a fastener wherein the head is provided with a shiftable section, which in one position permits insertion and withdrawal of a complementary shank and in another position secures the shank against axial displacement.

More specifically the invention contemplates a fastener as set forth above, wherein the shank comprises a plurality of sections which may be spread apart after the insertion thereof within an aperture for the purpose of securing the shank against disengagement, and the present invention contemplates means supported by and shiftable with respect to the head of the fastener for maintaining the shank in spread condition.

It is also an object of the present invention to provide a readily attachable and detachable fastener of the type referred to above, wherein the means for maintaining the shank in spread condition may be formed integral with the head or it may be a separate part supported by, and shiftable with respect to the head.

Other objects and advantages will be more apparent from the following detailed description when considered in connection with the accompanying drawing, wherein—

Fig. 1 is a perspective view disclosing a fastener of the present invention secured to a work panel;

Fig. 2 is an enlarged vertical sectional view of the fastener as shown in Fig. 1, taken substantially along the line 2—2 of Fig. 1 just after the initial insertion of the fastener shank into the work aperture and before the shank sections have been spread radially outwardly into work securing position;

Fig. 3 is a vertical sectional view similar to Fig. 2 showing the spreader member of the fastener engaging an abutment on one of the head members so as to spread the shank sections into work securing position;

Fig. 4 is an elevational view taken from the left of Fig. 2 showing the position occupied by the spreader member before the fastener is finally secured in position;

Fig. 5 is an elevational view similar to Fig. 4 showing the spreader member moved from the position shown in Fig. 4 into engagement with the abutment surface on one of the fastener head members;

Fig. 6 is a perspective view of the fastener illustrated in Figs. 1 to 5, inclusive, equipped with a modified form of catch consisting of cooperating detents or dimples in the spreader member and the complementary head member;

Fig. 7 is a perspective view similar to Fig. 6 showing a fastener with a modified form of spreader member pivotally carried by one of the head members; and Fig. 8 is a perspective view of a modified form of fastener wherein the entire structure is made from a single piece of strip stock, and wherein the spreader member is formed integral with one of the head members and is shiftable in a plane substantially parallel to the shank axis, as distinguished from the disclosure in the previously mentioned figures wherein the spreader member is shiftable in a plane extending substantially normal to the shank axis.

Referring now to the drawing more in detail wherein like numerals have been employed to designate similar parts throughout the various figures, it will be seen that one embodiment of the invention consists of a two-piece fastener designated generally by the numeral 10. This fastener 10 is preferably made from strip sheet stock. One portion of the fastener comprises a shank 12 formed by bending the strip stock back upon itself so as to provide a pair of shank sections 14 connected at 16, the entering extremity of the shank. The opposite extremities of the shank sections 14 support integral head sections 18 and 20 extending laterally from the shank sections to provide a shank head 22.

The shank sections 14 are normally spread apart a distance providing a reduced peripheral section which will just permit the insertion of the shank within an aperture 24 of a work piece or panel 26, Fig. 2. In order to spread these shank sections 14 and enlarge the peripheral section so as to carry oppositely disposed shoulders 28 into securing association with the work panel 26, as illustrated in Fig. 3, a spreader member or plate 30 is provided. In the embodiment disclosed in Figs. 1 to 6, inclusive, this spreader member or plate 30 is apertured to accommodate an extrusion 32 in the head 20, and this extrusion serves to pivotally secure the member 30 to the head 20. With the spreader member 30 in the position shown in Figs. 2, 4 and 6, the shank sections 14 occupy their normally spaced relation which is sufficient to permit insertion within the work aperture 24. After the shank has thus been inserted and the head members 18 and 20 brought to bear against the work surface, as illustrated in Figs. 2 and 4, the member or lever 30 may now be shifted about the pivot 32 through substantially 90° from the position shown in Figs. 2, 4 and 6 to the position shown in Figs. 1, 3 and 5.

In this shifted position the outer or cam edge 34 moves into engagement with a complementary abutment 36 formed integral with the outer margin of the head 18, and the effective length of the spreading member is such as to cause the head members 18—20, and consequently the shank sections 14, to move radially outwardly from the position shown in Fig. 4 to the position shown in Fig. 5. When the spreading member 30 has been moved to the final position shown in Fig. 5, the shank sections 14 will be so spread as to assure locking association thereof with the work piece and the lead members 18 and 20 will be shifted from their presentation of a reduced head area (Fig. 4) to an enlarged head area (Fig. 5). In the disclosed embodiment, this locking association consists of shoulder means 28 designed to cooperate with the head members 18 and 20 in securing the fastener in a fixed position upon the work piece.

In order to resist any tendency for the spreader member 30 to loosen, a latch arrangement or catch is provided consisting of a section 38 formed integral with the head 18 and the outer extremity of a latch member 40 formed integral with the spreader member 30. As the spreader member 30 approaches its final position, shown in Fig. 5, the latch member 40 will snap past the lowermost surface of the complementary latch member or catch 38. Thus in order to shift the spreader member 30 in a counterclockwise position from the position illustrated in Fig. 5, it will be necessary to overcome the resistance established between the interlocked catch members 38—40. In Fig. 6 a fastener is shown which is substantially identical with the fastener illustrated in Figs. 1 to 5, inclusive, the only difference being that in addition to the interlocking catch members 38—40, complementary dimples or detents 42—44 are shown. The detent 42 is provided in association with the head 18 and the dimple 44 is formed in the vicinity of the free extremity of the spreader arm 30.

In Fig. 7 a slightly modified form of fastener is shown which is designated generally by the numeral 10a. The only structural difference between the fastener 10a and the fastener shown in Fig. 6 is the form of the spreader member 30a. This spreader member 30a, like the spreader member 30, is pivotally secured at 32a to the head member 20a. In the position shown in Fig. 7, the spreader member 30a is detached from the abutment 36a so as to permit the shank sections 14a to occupy their normal unspread relation. When the spreader member 30a is pivoted so as to bring the arcuate periphery thereof into engagement with the abutment 36a, the head members 18a—20a, as well as the shank sections 14a are spread so as to lock the fastener in its secured position. Complementary dimples or detents 42a and 44a cooperate to secure the spreader member against inadvertent disengagement from the abutment 36a.

Thus far the described embodiment of the invention has contemplated two pieces—one forming the head and shank and the other a spreader member. The spreader member previously described is shiftable in a plane which extends transversely and, in fact, substantially normal to the shank axis. In Fig. 8 a modified form of fastener designated generally by the numeral 10b may be made from a single strip of sheet metal stock. All of the parts of this fastener corresponding with the fastener previously described are identified by similar numerals bearing the suffix "b." It will be seen from Fig. 8 that the fastener 10b contemplates a shiftable spreader member or arm 30b which is formed integral with a head member 18b. The connection between the arm 30b and the head member 18b provides a hinge or pivot 32b which permits movement or shifting of the spreader member 30b within a plane extending in substantial parallelism with the shank axis. When the spreader member 30b is shifted so as to lie in juxtaposition with respect to the outer surfaces of the head members 18b—20b, a cam or arcuate surface 34b on the member 30b will have coacted with an abutment 36b to bring about the desired spreading of shank sections 14b. In this position suitable catch or latching members 42b—44b coact to secure the member 30b against inadvertent disengagement from the abutment 36b.

From the foregoing it will be apparent that the present invention contemplates a very simple yet practical fastener design which makes it possible to attach or detach the same with respect to an apertured work piece. By employing a spreader member which is shiftable with respect to and supported by one of the head members, the shank sections may be urged and secured positively in their work securing spread position. The simple shifting of the spreader member to its engagement with the abutment on the shank head assures permanent association of the fastener with the work panel. As previously pointed out, the fastener may be made from simple sheet metal stampings and may be produced by practicing conventional forming and stamping operations. It will also be apparent from the foregoing description that the head portion of the fastener, together with the spreader member, provides an effective seal which may completely cover the aperture into which the fastener shank is inserted. In many applications this is an important and desirable feature. While certain specific embodiments of the invention have been disclosed herein for purposes of illustration, it will be apparent that other modifications and changes may be made without departing from the spirit and scope of the appended claims.

The invention is hereby claimed as follows:

1. A fastener comprising a shank having a plurality of longitudinally extending shank sections connected together at one end and shiftable toward and away from each other and normally disposed to present a reduced peripheral section, a head comprising head members each secured to a corresponding shank section at the other end thereof and projecting outwardly therefrom and movable therewith transversely of the shank axis between a position presenting a reduced head area and a position presenting an enlarged head area, at least one of said shank sections having an outwardly projecting portion spaced from said head, abutment means carried by and movable with one head member, and a shank spreading member pivotally carried by and movable with the other head member and shiftable relative thereto between an inoperative position out of engagement with said abutment means and an operative position in engagement with said abutment means, the effective length of said shank spreading member being such as to effect lateral separation of said head members with resultant spreading of said shank sections when in engagement with said abutment means.

2. A fastener as claimed in claim 1, wherein there is provided catch means for securing the spreading member against inadvertent disengagement from said abutment means.

3. A fastener as claimed in claim 1, wherein the spreading member is provided with a camming surface at its free end cooperating with said abutment means to spread the head members and shank sections.

4. A fastener as claimed in claim 1, wherein the spreading member is shiftable in a plane extending substantially transversely of the shank axis.

5. A fastener as claimed in claim 1, wherein the spreading member is shiftable substantially in the plane of the shank axis.

6. A fastener as claimed in claim 1, wherein the spreading member comprises a plate-like member resting upon the outer surface of its associated head member and separately pivoted thereto.

7. A fastener as claimed in claim 6, wherein the plate-like member is substantially circular and there is provided catch means for maintaining the same in engagement with said abutment means.

8. A fastener as claimed in claim 1, wherein the spreading member comprises an elongated plate-like member integrally connected to its associated head member and shiftable substantially in the plane of the shank axis.

OUGLJESA JULES POUPITCH.

References Cited in the file of this patent

UNITED STATES PATENTS

| Number | Name | Date |
|---|---|---|
| 505,437 | Carter | Sept. 26, 1893 |
| 2,128,005 | Lombard | Aug. 23, 1938 |
| 2,220,135 | Wardell | Nov. 5, 1940 |
| 2,513,847 | Covey | July 4, 1950 |
| 2,521,317 | Waara | Sept. 5, 1950 |
| 2,540,396 | Krach | Feb. 6, 1951 |
| 2,627,294 | Bedford | Feb. 3, 1953 |